United States Patent [19]
Reber et al.

[11] Patent Number: 6,032,195
[45] Date of Patent: Feb. 29, 2000

[54] METHOD, SYSTEM, AND ARTICLE FOR NAVIGATING AN ELECTRONIC NETWORK AND PERFORMING A TASK USING A DESTINATION-SPECIFIC SOFTWARE AGENT

[75] Inventors: William L. Reber, Rolling Meadows, Ill.; Cary D. Perttunen, Shelby Township, Mich.

[73] Assignee: Motorola, Inc., Schaumburg, Ill.

[21] Appl. No.: 09/127,371

[22] Filed: Jul. 31, 1998

[51] Int. Cl.[7] ................................................ G06F 13/00
[52] U.S. Cl. ........................................ 709/245; 246/220
[58] Field of Search .................................... 709/245, 246, 709/227, 217, 219, 226, 220

[56] References Cited

U.S. PATENT DOCUMENTS

| | | | |
|---|---|---|---|
| 5,804,803 | 9/1998 | Cragun et al. ........................... | 235/375 |
| 5,869,819 | 2/1999 | Knowles et al. ......................... | 235/375 |
| 5,905,248 | 5/1999 | Russell et al. ........................... | 235/462 |
| 5,905,251 | 5/1999 | Knowles ................................. | 235/472.01 |

FOREIGN PATENT DOCUMENTS

WO 98/03923   1/1998   WIPO .

OTHER PUBLICATIONS

Michalski, Jerry, "If Links Could Talk", Esther Dyson's Monthly Report, Edventure Holdings Inc., Dec. 30, 1997, pp. 1–19.

*Primary Examiner*—Zarni Maung
*Attorney, Agent, or Firm*—James E. Gauger

[57] ABSTRACT

A method comprises steps of reading (80) an optical code (14) associated with a destination (20) of an electronic network (10), retrieving (92) task information associated with the destination (20) based upon the optical code (14), linking (94) to the destination (20) based upon the optical code (14), and performing (96) a task with the destination (20) using the task information. A system and an article are provided to perform the aforementioned steps.

27 Claims, 2 Drawing Sheets

METHOD, SYSTEM, AND ARTICLE FOR NAVIGATING AN ELECTRONIC NETWORK AND PERFORMING A TASK USING A DESTINATION-SPECIFIC SOFTWARE AGENT

RELATED APPLICATION

The present application is related to the following application:

"Optical Code Reader and Methods and Articles Therefor", having Docket No. MNE00546 and Ser. No. 60/087,906 filed Jun. 4, 1998, now abandoned.

The subject matter of the above-identified related application is hereby incorporated by reference into the disclosure of this application.

FIELD OF THE INVENTION

The present invention relates to methods and systems for navigating an electronic network, and for performing a task using the electronic network.

BACKGROUND OF THE INVENTION

The World Wide Web uses an addressing system known as a URL (Uniform Resource Locator) that defines the location of a resource on the Internet. URLs can include a protocol, a domain name, a path, and a filename. The combination of these four parts can produce a complex address for a resource. For example, the address for information on two-way pagers on the Motorola home page is: http://www.mot.com/MIMS/MSPG/Products/Two-way/tango/desc.html.

As the number of resources on the Internet increases, newly-formed URLs become less intuitive and greater in length. Further, some entities are finding that domain names which they desire are already reserved. As a result, some entities have to purchase or acquire their desired domain name from another holder, or have to reserve a less than desirable domain name.

There are many different tasks that an end user can perform using resources of the Internet. Examples of tasks include downloading content and making on-line purchases. To perform an on-line purchase, for example, an end user manually enters information to facilitate the purchase from an associated Web page. However, purchases from different Web pages may require different information to be submitted by the end user.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Embodiments of the present invention advantageously provide methods and systems for automatically navigating an electronic network to a destination and automatically performing a task at the destination using a software agent. In this way, the electronic address of the destination, the format of the electronic address, and information required to perform the task become more transparent to the end user.

Figure 1:
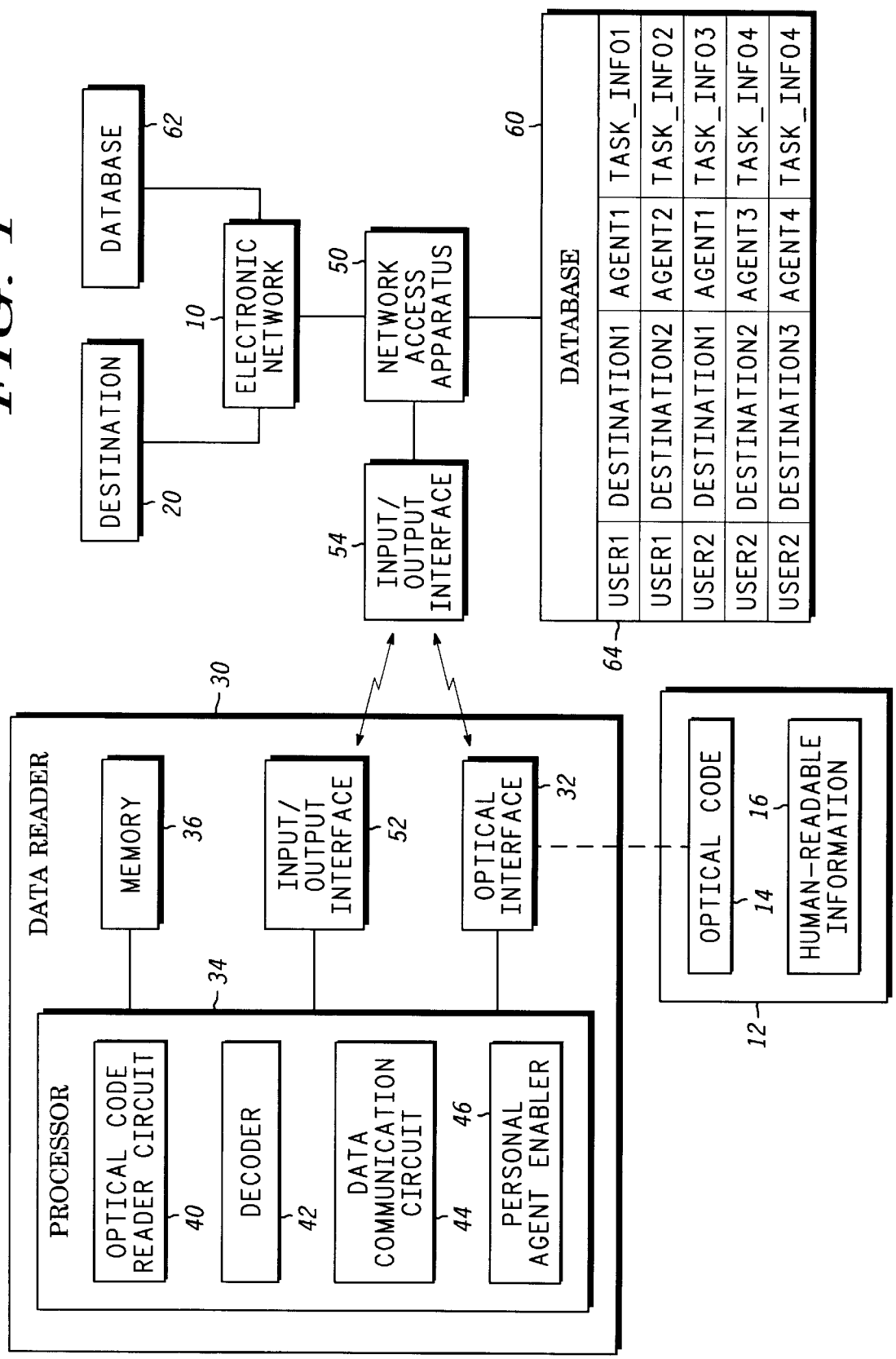
FIG. 1 is a block diagram of an embodiment of a system for navigating an electronic network and performing a task.

FIG. 1 is a block diagram of an embodiment of a system for navigating an electronic network 10 and performing a task. Preferably, the electronic network 10 includes an open, wide area network such as the Internet, the World Wide Web, or an online service. Other examples of the electronic network 10 include but are not limited to: an intranet, an extranet, a local area network, a telephone network such as a public switched telephone network, a cellular telephone network, a personal communication system (PCS) network, a television network such as a cable television system, a paging network such as a local paging network, a regional paging network, a national paging network, or a global paging network, and a wireless data network such as a satellite data network or a local wireless data network.

A network navigation device 12 having an optical code 14 and human-readable information 16 is used to identify a destination 20 and a task associated with the destination 20. Preferably, the network navigation device 12 comprises a substantially flat substrate which supports the optical code 14 and the human-readable information 16. Examples of materials which can be used to for the substrate include, but are not limited to, dielectric materials such as paper, cardboard, and plastic, and substantially nonmagnetic materials. It is noted that, in general, the substrate need not be homogeneous, i.e. more than two materials can be utilized to form the substrate. In an exemplary embodiment, the network navigation device 12 comprises a sheet of material supporting the optical code 14 and the human-readable information 16 in a printed form.

The human-readable information 16 is associated with either the destination 20, a means for navigating to the destination 20, or the task associated with the destination 20, to provide an intuitive and/or understandable representation thereof. Generally, the human-readable information 16 can include textual information and/or graphical information to provide a more intuitive representation of the destination 20 than an electronic address of the destination 20.

The destination 20 is provided by a server computer in communication with the electronic network 10. Preferably, the destination 20 is identified by an electronic address using at least a portion of a URL (Uniform Resource Locator), a URN (Uniform Resource Name), an IP (Internet Protocol) address, or an electronic mail address. It is noted that a URL can include: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet:" for opening a telnet session; and "wais:" for accessing a WAIS server.

The optical code 14 either directly or indirectly encodes navigation data for navigating to the destination 20 via the electronic network 10. For example, the optical code 14 can encode, in accordance with a bar code format, the electronic address for the destination 20. Alternatively, the optical code 14 can provide a code translatable to the electronic address for the destination 20.

Regardless of the data encoded thereby, the optical code 14 preferably includes a printed code such as a one-dimensional or a two-dimensional bar code. Examples of one-dimensional bar code formats include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar code formats include, but are not limited to, Data Matrix and PDF417.

Typically, the printed form of the optical code 14 is not readily interpretable or not readily discernible by an end user. For example, although a human may be specially trained to mentally decode a bar code, such a code is practically indiscernible by untrained humans. Further, the optical code 14 can be printed to be either visible or invisible to the end user.

A data reader 30 is used to read the optical code 14 from the network navigation device 12. The form of the data reader 30 is dependent upon the form of the optical code 14. For printed data, the data reader 30 can include an optical data reader such as a bar code reader, a scanning wand, a handheld scanner, a page scanner, a business card reader, a photograph reader, a fax machine, or generally, a linear CCD (charge coupled device) reader or a two-dimensional CCD reader.

As alternatives to the optical code 14, other types of machine-readable data can be used to identify the destination and the task associated with the destination. Examples of alternatives to the optical code 14 include, but are not limited to, magnetic data and electronic data. Alternative forms of the data reader 30 are also contemplated based upon the machine-readable data. For magnetically-stored data, the data reader 30 can include a magnetic read head. For electronically-stored data, the data reader 30 can include an interface or a receiver. If desired, the machine-readable data can be selected to be readable by more than one type of data reader. For example, printed data can be printed with a magnetic substance, such as magnetic ink, so as to be readable by both an optical reader and a magnetic reader.

A preferred embodiment of the data reader 30 is based upon the disclosure in the application entitled "OPTICAL CODE READER AND METHODS AND ARTICLES THEREFOR" incorporated by reference into the present disclosure. In this case, the data reader 30 comprises an optical interface 32, a processor 34, and a memory 36.

The optical interface 32 includes an infrared emitter and an infrared detector. The processor 34 provides an optical code reader circuit 40 to direct the infrared emitter to illuminate the optical code 14, and to direct the infrared detector to read the optical code 14. The optical code reader circuit 40 generates data associated with the optical code 14 based upon a signal from the infrared detector.

The processor 34 further provides a decoder circuit 42 to decode the optical code 14 based upon the data Preferably, the decoder circuit 42 decodes the data in accordance with a bar code format, such as any of those previously mentioned herein. Decoded data associated with the optical code 14 is stored in the memory 36. Preferably, the memory 36 includes a nonvolatile memory device as an EEPROM (electrically erasable programmable read only memory). Alternatively, the memory 36 can store raw non-decoded data from the optical code reader circuit 40.

The processor 34 further provides a data communication circuit 44 to communicate data associated with the optical code 14. Preferably, the data communication circuit 44 directs the optical interface 32 to communicate a message based upon the decoded data stored in the memory 36, and hence, based upon the optical code 14. In this case, the data communication circuit 44 directs the infrared emitter to transmit the message, and the infrared detector to receive response messages in accordance with a communication protocol. Preferably, an IrDA (Infrared Data Association) protocol is used to communicate the message.

The processor 34 further provides a personal agent enabler 46 to direct an external device, such as a network access apparatus 50, to retrieve and execute a destination-specific software agent. The software agent facilitates the completion of a task associated with the destination 20. The personal agent enabler 46 directs the optical interface 32 to transmit a message to direct the retrieval and execution of the software agent. In this case, the personal agent enabler 46 directs the infrared emitter to transmit the message, and the infrared detector to receive response messages in accordance with a communication protocol. Preferably, an IrDA protocol is used to communicate the message.

As an alternative to communicating data using the optical interface 32, the data reader 30 can include an input/output interface 52 in communication with the data communication circuit 44. Examples of the input/output interface 52 include, but are not limited to, wireline interfaces such as a serial interface or a parallel interface, and wireless interfaces such as an optical interface or a radio frequency interface.

By use of either the optical interface 32 or the input/output interface 52, the data reader 30 transmits a message associated with the optical code 14 to an input/output interface 54 in communication with a network access apparatus 50. Examples of the input/output interface 54 include, but are not limited to, a serial wireline interface, a parallel wireline interface, an optical interface, or a radio frequency interface.

The network access apparatus 50 can have a variety of forms, including but not limited to, a general purpose computer, a network computer, a network television, an Internet television, an Internet telephone, a portable wireless device, a television receiver, a game player, a video recorder, and an audio component. Regardless of its form, the network access apparatus 50 typically includes a processor in communication with at least one input device, a memory, and at least one storage device.

The processor can include a microprocessor, an application-specific integrated circuit, or another suitable integrated circuit. The memory can include a read-only memory and/or a random access memory in communication with the processor. The at least one input device can include a keyboard and/or a pointing device for receiving user-initiated events from the end user. The at least one storage device can include a floppy disk drive, a PC card storage device, an optical drive, a DVD drive, a CD-ROM drive, or a hard drive to store computer-readable data.

To communicate with the electronic network 10, the network access apparatus 50 includes a modem, a network adapter, a wireless transceiver, a wireline transceiver, or another transceiver. The network access apparatus 50 can communicate with the electronic network 10 via a line such as a telephone line, an ISDN line, a coaxial line, a cable television line, a fiber optic line, a computer network line, or the like. Alternatively, the network access apparatus 50 can wirelessly communicate with the electronic network 10.

In response to receiving the message, the network access apparatus 50 performs steps to retrieve a software agent specific to the destination 20. The software agent is retrieved either locally from a database 60 or remotely from a database 62. The database 60 can be provided by any of the aforementioned storage devices of the network navigation apparatus 50. The database 62 is provided by a remote storage device accessible via the electronic network.

Each of the database 60 and the database 62 includes a plurality of records 64. Each of the records 64 associates at least one of a plurality of software agents to one of a plurality of destinations. The software agent specific to the destination 20 is determined by matching data associated with the optical code 14 and user identification information to one of the records 64. By including user identification information, different software agents and/or different task information can be provided to different end users for the same destination. The software agent and/or task information associated therewith is retrieved from the database 60 and/or the database 62.

To retrieve the software agent and/or the task information from the database 62, the network access apparatus 50 can link to the database 62 via the electronic network 10. In this case, for example, the network access apparatus 50 can transmit an electronic address identifying a server which provides the database 62. Thereafter, the network access apparatus 50 communicates a request message, including information based upon the optical code 14 and the user identification information, to the database 62. The database 62 determines the appropriate software agent and/or task information based upon the request message. The software agent and/or the task information are communicated by the database 62 in a reply message from the database 62. The network access apparatus 50 receives the reply message via the electronic network 10, and extracts the software agent and/or the task information.

Typically, the database 62 is remotely located from the destination 20. Further, it is typical that the database 62 has an electronic address that differs from the destination 20.

The task information and/or the software agent are enabled to facilitate completion of a destination-specific task. Examples of destination-specific tasks include, but are not limited to: obtaining information from the destination 20; purchasing and receiving entertainment content such music and video content from the destination 20; performing financial transactions such as investing, paying bills, and banking using the destination 20; making a retail purchase of goods such as a car, an appliance, equipment, computer hardware, computer software, books, food, and medicine using the destination 20; and making travel arrangements such as purchasing travel tickets using the destination 20. For some tasks, the task information can include personal information about the end user to facilitate a task such as a transaction. For other tasks, the task information can be absent of personal information.

For some tasks, the task information can include transaction information such as a credit card number, a debit card number, or an account transaction code. Different transaction information can be provided to different destinations. For example, first transaction information (e.g. a credit card number) can be associated with a first on-line vendor, and second transaction information (e.g. a personal identification code) can be associated with a second on-line vendor.

Further in response to receiving the message, the network access apparatus 50 performs steps to automatically navigate to the destination 20. If the message directly encodes the electronic address of the destination 20, the network access apparatus 50 decodes the message to determine the electronic address. Thereafter, the network access apparatus 50 links to the destination 20 using the electronic address.

If the optical code 14 indirectly encodes the electronic address, the electronic address is determined using a database. The database can be local to the network access apparatus 50 or can be accessible via the electronic network 10. In these cases, the database includes a plurality of records associating optical code data with electronic addresses. The database determines the electronic address by matching optical code data with one of the records. The database includes a storage device to store its data in a machine-readable form with a machine-readable storage medium. Examples of the machine-readable storage medium include, but are not limited to, an optical storage medium such as a compact disk read-only memory (CD-ROM) or a digital versatile disk (DVD), a magnetic storage medium such as a hard disk or a floppy disk, and an electronic storage medium such as a memory.

If the message includes non-decoded data associated with reading the optical code 14, the network access apparatus 50 decodes the data. In this case, for example, the network access apparatus 50 can decode the optical code 14 in accordance with a bar code format. Thereafter, the network access apparatus 50 links to the destination 20 using the decoded data.

After determining the electronic address, the network access apparatus 50 can perform any combination of: linking to the destination 20, transmitting one or more messages to the destination 20, and receiving one or more messages from the destination 20. By linking to the destination 20, the end user can link to a Web page or an online document, for example. One or more of the messages communicated to the destination 20 may be based upon the task information. Data received from the destination 20 may be processed in accordance with the destination-specific software agent.

A display device such as a monitor, a television, or a liquid crystal display, is either coupled to or included with the network access apparatus 50 to display visual information received from the destination 20.

In addition to reading and decoding optical codes, the data reader 30 can be programmed to provide an array of alternative features. The processor 34 can be programmed by receiving one or more messages via either the input/output interface 52 or the optical interface 32. The messages contain coded steps in a programming language. The messages can be transmitted either by the network access apparatus 50 via the input/output interface 54 or by a like data reader. The coded steps can be stored in a program memory for the processor 34.

Figure 2:
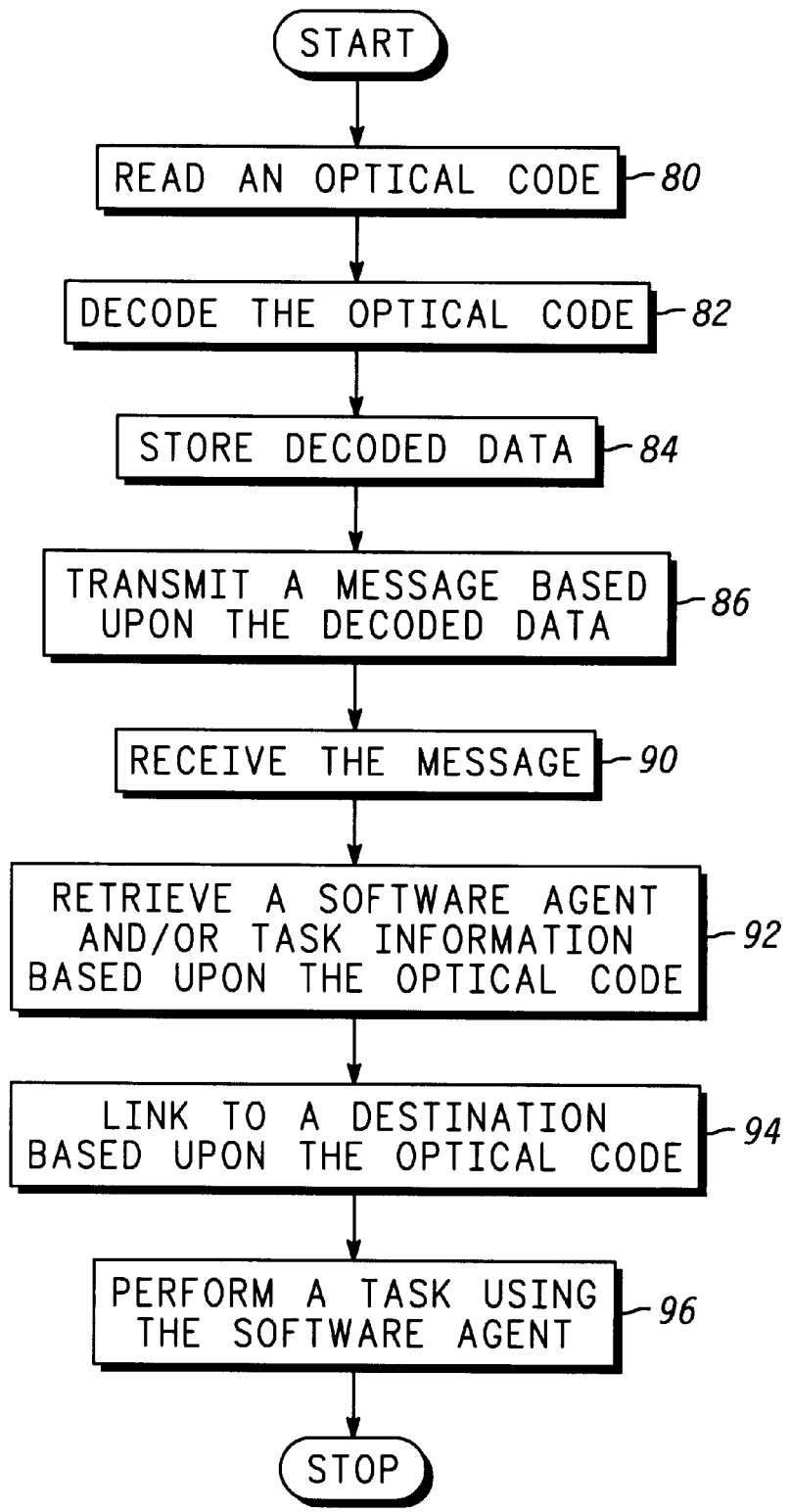
FIG. 2 is a flow chart of an embodiment of a method of navigating an electronic network and performing a task.

FIG. 2 is a flow chart of an embodiment of a method of navigating the electronic network 10 and performing a task. As indicated by block 80, the method includes a step of reading the optical code 14 from the network navigation device 12. The optical code 14 is read using the optical interface 32 and the optical code reader circuit 40 of the data reader 30. Preferably, the step of reading the optical code 14 includes reading a printed code such as a bar code. The printed code can be supported by a substrate such as paper, for example.

As indicated by block 82, a step of decoding the optical code 14 is performed. The optical code 14 is decoded based upon an optical code format, such as a bar code format, to produce decoded data. Preferably, data associated with the optical code 14 is decoded by the decoder circuit 42 of the data reader 30.

As indicated by block 84, a step of storing the decoded data is performed. Preferably, the decoded data is stored to the memory 36 of the data reader 30.

As indicated by block 86, a step of transmitting a message based upon the decoded data is performed. The message provides a first indication of the optical code 14 and a second indication enabling a software agent to perform a task.

Preferably, the message is transmitted by the optical interface 32 of the data reader 30. Alternatively, the message is transmitted by the input/output interface 52.

As indicated by block 90, a step of receiving the message is performed. Preferably, the message is received by the input/output interface 54, and communicated to the network access apparatus 50.

As indicated by block 92, a step of retrieving a software agent and/or task information is performed. The software agent and/or the task information is retrieved in response to the second indication that a destination-specific task is to be performed. If the message is absent of the second indication, this step may be omitted.

In general, the software agent and/or the task information is retrieved based upon the optical code 14. Preferably, the software agent and/or the task information is retrieved based upon the decoded data associated with the optical code 14. As described with reference to FIG. 1, the software agent and/or the task information is retrieved either from the database 60 or the database 62.

As indicated by block 94, the method includes a step of linking to the destination 20 via the electronic network 10. To establish a link to the destination 20, this step can include transmitting data representative of the electronic address of the destination 20 to the electronic network 10.

As described with reference to FIG. 1, a step of determining the electronic address based upon the decoded data can be performed prior to linking to the destination 20. The step of determining the electronic address 20 can include determining at least a portion of, and optionally, an entire portion of a URL, a URN, an IP address, or an electronic mail address, for example, associated with the optical code 14. If the decoded data comprises a portion of a URL, a portion of a URN, or a portion of an IP address, an additional step of completing the electronic address can be performed. For example, if an IP address is received, the IP address can be prepended by "http://". Alternatively, the electronic address can be retrieved from a database using a look-up operation based upon at least a portion of the decoded data.

The electronic address can comprise a prefix including the URL for the destination 20, and a suffix based upon the task information. In this way, the task information is provided to the destination 20 using a single command line. The destination 20 parses the command line to extract the task information.

As indicated by block 96, a step of performing a task using the software agent and/or the task information is performed. To perform the task, one or more messages received from the destination 20 can be processed by the software agent using the task information. The software agent can generate one or more messages based upon the task information. The one or more messages are transmitted to the destination 20 via the electronic network 10.

Three examples of using embodiments of the present invention are described. It is noted that the teachings in these examples can be interchanged to form additional examples.

EXAMPLE 1

In this example, the network navigation device 12 comprises an airline advertisement on a sheet of material such as paper. The human-readable information 16 includes printed information indicating a special fare for traveling to a location using the airline. The optical code 14 comprises a bar code encoding a URL for the destination 20. The destination 20 provides a Web page for on-line ticket purchases for the airline. The bar code further includes a code to enable a software agent specific to the destination 20. The software agent enables the task of purchasing a ticket.

Upon viewing the airline advertisement, the end user decides he/she would like to purchase a ticket in accordance with the special fare. To perform this task, the end user swipes the bar code using the data reader 30. The data reader 30 decodes the bar code to extract the URL for the destination 20. Once decoded, the URL is stored in the memory 36.

The end user directs the optical interface 32 toward the input/output interface 54, such as an infrared transceiver, and commands the data reader 30 to communicate an optical message. The optical message includes the URL for the destination 20, and an indication to enable the software agent specific to the destination 20 to perform the task of purchasing the ticket. The infrared transceiver receives the optical message, and communicates data representative thereof to the network access apparatus 50.

In this example, the network access apparatus 50 includes a personal computer for the end user. The personal computer retrieves the software agent and the task information, either from its local hard drive or from the database 62, to perform the transaction. The software agent queries calendar/schedule data from the personal computer to determine vacation days for the end user.

The software agent creates an electronic address having a prefix including the URL and a suffix based upon the task information. The suffix includes: (i) either desired departure times/dates or desired arrival times/dates in accordance with the vacation days; (ii) personal information for the end user, such as a name, an address, and a telephone number; and/or (iii) information requesting that a best fare price be determined. The software agent directs the personal computer to link to the electronic address. Once linked to the electronic address, the software agent can securely communicate payment information, such as a credit card number to which the transaction is charged, to the destination 20.

In response, the personal computer receives transaction confirmation information and electronic ticket information from the destination 20. The software agent can summarize this information for visual display to the end user. Additionally, the software agent can update data in the personal computer. For example, the calendar/schedule data can be automatically updated to indicate the flight.

EXAMPLE 2

In this example, the network navigation device 12 comprises a book review on a print medium such as a newspaper or a magazine. The human-readable information 16 includes a textual review of a book, and information indicating that the book can be purchased on-line using the optical code 14. The optical code 14 comprises a bar code encoding a URL for the destination 20. The destination 20 provides a Web page for on-line book purchases. Preferably, the optical code 14 further indicates the book to be purchased.

Upon reading the book review, the end user decides he/she would like to purchase the book. To perform this task, the end user swipes the bar code using the data reader 30. The data reader 30 decodes the bar code to extract the URL for the destination 20. Once decoded, the URL is stored in the memory 36.

The end user directs the optical interface 32 toward the input/output interface 54, such as the aforementioned infrared transceiver, and commands the data reader 30 to communicate an optical message. The optical message includes the URL for the destination 20, and an indication to enable a software agent specific to the destination 20 to perform the task of purchasing the book. The infrared transceiver receives the optical message, and communicates data representative thereof to the network access apparatus 50.

In this example, the network access apparatus 50 includes the personal computer of the end user. The personal computer retrieves the software agent and the task information, either from its local hard drive or from the database 62, to perform the transaction.

The software agent directs the personal computer to link to the destination 20 using the URL. Inherent in the URL is an indication of the book. Upon linking to the destination 20, the software agent communicates task-specific information such as: (i) personal information for the end user, such as a name and a delivery address; and (ii) payment information, such as a credit card number to which the transaction is charged.

In response, the personal computer receives, via the electronic network 10, transaction confirmation information from the destination 20. The software agent can summarize this information for visual display to the end user.

It is noted that the scope of this example should not be construed as being limited to purchasing a book, but can be generalized for purchasing any product.

EXAMPLE 3

In this example, the network navigation device 12 comprises a bill or an invoice on a sheet of material such as paper. The human-readable information 16 includes printed information such as the end user's name and address, a billing company, an account number, a billing amount (e.g. in dollars), and a due date. The optical code 14 comprises a first bar code encoding a URL for the destination 20, a second bar code encoding an account code, and a third bar code encoding the billing amount.

Upon viewing the bill, the end user decides he/she would like to electronically pay the bill. To perform this task, the end user swipes the first bar code, the second bar code, and the third bar code using the data reader 30. The data reader 30 decodes the first bar code to extract the URL for the destination 20, the second bar code to extract the account code, and the third bar code to extract the billing amount. The URL, the account code, and the billing amount are stored in the memory 36.

The end user directs the optical interface 32 toward the input/output interface 54, such as the aforementioned infrared transceiver, and commands the data reader 30 to communicate an optical message. The optical message includes the URL for the destination 20, the account code, the billing amount, and an indication to enable asoftware agent to perform the task of paying the bill. The infrared transceiver receives the optical message, and communicates data representative thereof to the network access apparatus 50.

In this example, the network access apparatus 50 includes the personal computer of the end user. The personal computer retrieves a bill-paying software agent and bill-paying task information either from its local hard drive or from the database 62.

The software agent directs the personal computer to link to the destination 20 using the URL. The destination 20 provides an on-line site for electronically paying the bill. Upon linking to the destination 20, the software agent communicates task-specific information such as: (i) the account code and (ii) payment information such as a checking account number to pay the bill and an authorized amount such as the billing amount. In response, the personal computer receives, via the electronic network 10, a return receipt with a confirmation number. The software agent can summarize this information for visual display to the end user.

It is noted that articles of manufacture can be formed to direct the data reader 30 and the network access apparatus 50 to perform the herein-described steps. Each article of manufacture can include a machine-readable storage medium having machine-readable data stored therein which directs the network access apparatus to perform the above-described steps. Examples of the machine-readable storage medium include, but are not limited to, a logic circuit, a memory, a mass storage medium, an optical disk, a CD-ROM, a magnetic disk, a floppy disk, a hard disk, and a PCMCIA card.

Thus, there has been described herein several embodiments including preferred embodiments of a method, system, and article to navigate an electronic network and perform a task.

Because the various embodiments of the present invention enable two or more operations to be performed in response to reading an optical code, they provide a significant improvement in that steps of linking to a destination and performing a task with the destination are both initiated. In some cases, an end user can perform the task without navigating through an otherwise-necessary hierarchy of menus.

Additionally, embodiments of the present invention create an electronic address based upon both the optical code and task information to pass the task information in a single command line. The electronic address can comprise a prefix based upon the optical code and a suffix based upon the task information.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising the steps of:
   reading an optical code associated with a destination of an electronic network;
   retrieving task information associated with the destination based upon the optical code;
   retrieving, from a location remote from the destination, at least one software agent specific to the destination based upon the optical code;
   linking to the destination based upon the optical code; and
   performing a task with the destination using the task information and the at least one software agent.

2. The method of claim 1 wherein the optical code comprises a bar code.

3. The method of claim 1 wherein the task information comprises user information.

4. The method of claim 1 wherein the task information comprises transaction information.

5. The method of claim 1 wherein the step of retrieving the task information comprises receiving the task information from a database via the electronic network.

6. The method of claim 5 wherein the step of retrieving the task information further comprises communicating a request message to the database, the request message including information based upon the optical code and user identification information.

7. The method of claim 1 wherein the step of linking to the destination comprises transmitting an electronic address based upon the optical code and the task information.

8. The method of claim 7 further comprising the step of creating the electronic address having a prefix based upon the optical code and a suffix based upon the task information.

9. The method of claim 7 further comprising the step of transmitting a message based upon the task information upon linking to the destination.

10. The method of claim 1 wherein the task comprises an on-line transaction.

11. The method of claim 1 wherein the step of retrieving the at least one software agent comprises retrieving the at least one software agent from a database having a plurality of software agents, each of the software agents being specific to a corresponding one of a plurality of destinations.

12. The method of claim 1 wherein the step of performing the task with the destination comprises:

receiving a first message from the destination;

using the software agent to process the first message with the task information and to generate a second message; and transmitting the second message to the destination.

13. A system comprising:

an optical code reader to read an optical code associated with a destination of an electronic network; and a network navigation apparatus responsive to the optical code reader to retrieve task information associated with the destination based upon the optical code, to retrieve, from a location remote from the destination, at least one software agent specific to the destination based upon the optical code, to link to the destination based upon the optical code, and to perform a task with the destination using the task information and the at least one software agent.

14. The system of claim 13 wherein the optical code reader comprises a bar code reader.

15. The system of claim 13 wherein the task information comprises user information.

16. The system of claim 13 wherein the task information comprises transaction information.

17. The system of claim 13 wherein the network access apparatus retrieves the task information from a database via the electronic network.

18. The system of claim 17 wherein the network access apparatus retrieves the task information by communicating a request message to the database, the request message including information based upon the optical code and user identification information.

19. The system of claim 13 wherein the network access apparatus links to the destination by transmitting an electronic address based upon the optical code and the task information.

20. The system of claim 19 wherein the network access apparatus creates the electronic address having a prefix based upon the optical code and a suffix based upon the task information.

21. The system of claim 19 wherein the network access apparatus transmits a message based upon the task information upon linking to the destination.

22. The system of claim 13 wherein the task comprises an on-line transaction.

23. The system of claim 13 wherein the network access apparatus comprises a computer.

24. The system of claim 13 wherein the network access apparatus retrieves the at least one software agent from a database having a plurality of software agents, each of the software agents being specific to a corresponding one of a plurality of destinations.

25. The system of claim 24 wherein the network access apparatus is to perform the task with the destination by receiving a first message from the destination, using the software agent to process the first message with the task information and to generate a second message, and transmitting the second message to the destination.

26. An article of manufacture comprising:

a computer-readable storage medium; and computer-readable data stored by the computer-readable storage medium, the computer-readable data to direct a network navigation apparatus to retrieve task information associated with a destination of an electronic network based upon an optically-read code, to retrieve, from a location remote from the destination, at least one software agent specific to the destination based upon the optical code, to link to the destination based upon the optically-read code, and to perform a task with the destination using the task information and the at least one software agent.

27. A method comprising the steps of:

reading a bar code associated with a destination of an electronic network;

retrieving a software agent and task information specific to the destination based upon the bar code, the task information including user information and transaction information, the software agent and the task information retrieved from a database via the electronic network, the database remotely located from the destination, the database having a plurality of software agents, each of the software agents being specific to a corresponding one of a plurality of destinations;

creating an electronic address having a prefix based upon the bar code and a suffix based upon the task information;

linking to the destination based upon the electronic address; and performing an on-line transaction with the destination using the software agent.

* * * * *